Oct. 18, 1949.  A. M. CANDY  2,485,357
FERRULE FOR WELDING STUDS
Filed May 5, 1947

Inventor:
Albert M. Candy.
By Brown, Jackson, Boettcher & Dienner
Attys

Patented Oct. 18, 1949

2,485,357

UNITED STATES PATENT OFFICE 2,485,357

FERRULE FOR WELDING STUDS

Albert M. Candy, La Grange, Ill., assignor, by mesne assignments, to National Cylinder Gas Company, Chicago, Ill., a corporation of Delaware Application May 5, 1947, Serial No. 746,074

2 Claims. (Cl. 219—8)

My invention relates, generally, to ferrules for welding studs, and it has particular relation to the shape and formation thereof to facilitate handling and gripping of the same for holding it in operative position with respect to a welding stud while the welding operation is being performed.

Among the objects of my invention are: To provide for gripping a ferrule for welding studs between the upper and lower faces of the ferrule; to construct the ferrule so that it can be gripped readily by the application of force from diametrically opposite positions; to shape the ferrule so that it may be gripped automatically on the application of a gripping mechanism thereto; and to correlate the portion of the ferrule that permits the automatic gripping thereof with the portion which permits holding of the same, so that the ferrule may be automatically gripped and held in operative position.

Other objects of my invention will, in part, be obvious and, in part, appear hereinafter.

Accordingly, my invention is disclosed in the embodiment thereof as shown in the accompanying drawing and it comprises the features of construction and arrangement of surfaces which will be exemplified in the construction hereinafter set forth and the scope of the application of which will be indicated in the appended claims.

For a more complete understanding of the nature and scope of my invention, reference can be had to the following detailed description, taken together with the accompanying drawing, in which.

Figure 1:
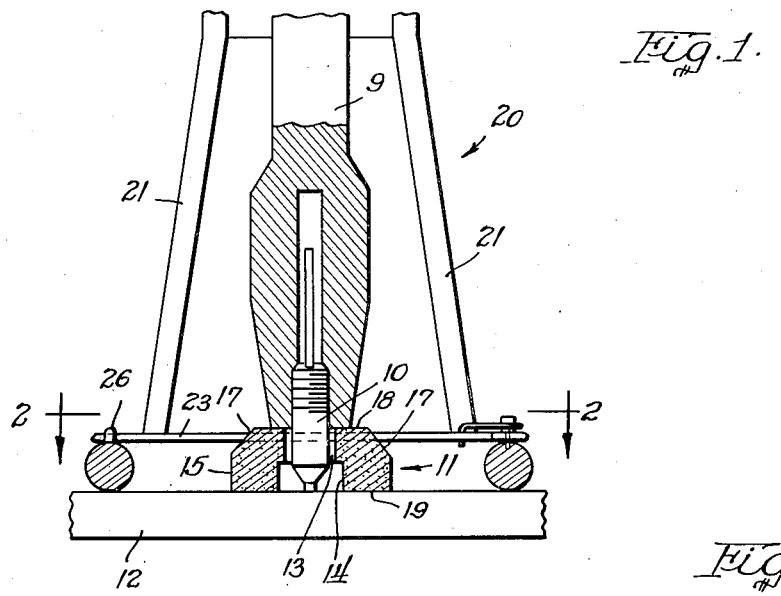
Figure 1 is a view, partly in side elevation and partly in section showing the chuck of a stud welding gun and a portion of the associated frame which supports the same and engages the work piece, the welding stud being shown in the chuck with the welding stud ferrule of the present invention positioned therearound.
Figure 2:
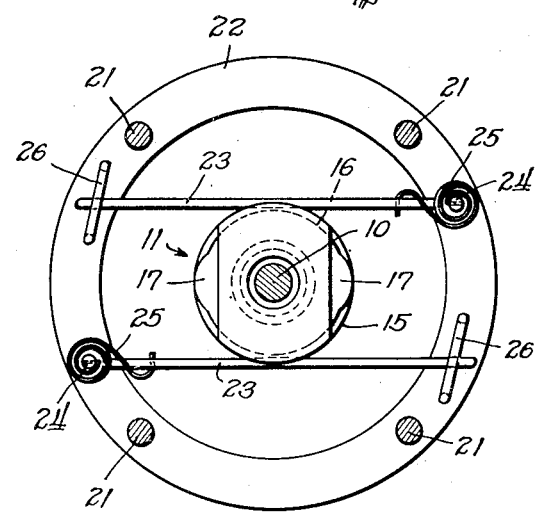
Figure 2 is a detail sectional view taken along the line 2—2 of Figure 1.

Referring now particularly to Figures 1 and 2 of the drawing, it will be observed that the reference character 9 designates a chuck of a stud welding gun for holding a stud 10 therein. The stud welding gun may be constructed as disclosed in my co-pending application, Serial No. 700,054 filed September 28, 1946 (now Patent No. 2,451,716, dated October 19, 1948). The construction of the stud 10 may be as set forth in my co-pending application, Serial No. 674,994 filed June 7, 1946, or application, Serial No. 683,293 filed July 13, 1946 (now Patent No. 2,441,257, dated May 11, 1948). All of these applications are assigned to the assignee of this application.

The stud 10 extends down through a welding stud ferrule that is indicated, generally, at 11 and which embodies the present invention. The ferrule 11 rests on a work piece 12 to which the stud 10 is to be welded electrically. It is formed of suitable heat resisting material, such as fire clay, lava or the like, and it has a central opening 13 through which the stud 10 can project. Different sizes of ferrule 11 provided with different diameters of opening 13 are provided to accommodate different diameters of stud 10. The lower end of the aperture 13 is enlarged, as indicated at 14, to permit expansion of the molten weld metal during the performance of the welding operation.

Figure 3:
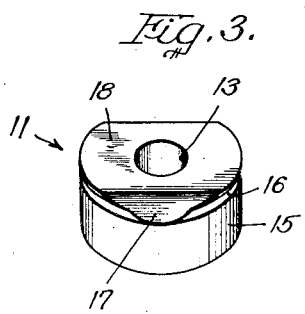
Figure 3 is a perspective view of a welding stud ferrule formed and shaped in accordance with my invention.

The construction of the exterior surface of the ferrule 11 is important. As shown in Figures 2 and 3 of the drawing, the ferrule 11 has a generally outer cylindrical surface 15 near the upper edge of which there is located a peripheral groove 16 which, as described hereinafter, is provided to facilitate gripping of the ferrule 11. Portions of the upper end of the ferrule 11 are cut away to provide inclined surfaces 17 which facilitate automatic gripping of the ferrule 11. The ferrule 11 may be formed with the peripheral groove 16 and inclined surfaces 17 initially, or they may be formed by suitable cutting or grinding operations as desired. The peripheral groove 16 is located between the upper surface 18 and the lower surface 19 of the generally cylindrical ferrule 11. The inclined surfaces 17 extend from the upper surface 18 to the peripheral groove 16 where they intersect the same, as illustrated in Figures 2 and 3.

The stud welding gun is supported by a frame, a part of which is indicated, generally, at 20. The frame 20 includes legs 21 which may be secured, as by welding, to a ring 22 that is arranged, as shown, to contact the upper surface of the work piece 12. This construction and the additional parts thereof, to be described presently, are shown and claimed in my co-pending application, Serial No. 746,073 filed May 5, 1947, now Patent No. 2,447,113, dated August 17, 1948, and assigned to the assignee of this application.

With a view to gripping the welding stud ferrule 11 automatically, a pair of arms 23, in the form of rods, are pivoted at 24 on opposite sides of the ring 22 and above its upper surface. Spiral springs 25 are employed to bias the arms 23 toward each other and into gripping engagement with the ferrule 11. Stop means, in the form of loops 26 of rod-like material are secured to the ring 22 and extend from its upper surface and cooperate with the adjacent ends of the arms 23 for limiting their movement relative to the ring 22. They serve as stops for limiting the movement of the arms 23 toward each other in the absence of the ferrule 11. Also they hold the arms 23 in such position that, when the frame 20 of the stud welding gun is moved downwardly with the stud 10 in the chuck 9 to position the former in the ferrule 11 for welding to the work piece 12, the arms 23 will be spread by moving over the downwardly and outwardly inclined surfaces 17 of the ferrule 11 until they register with the peripheral groove 16. Thereafter, either the ferrule 11 is turned while the stud welding gun and frame 20 remain stationary, or vice versa, so that the arms 23 interfit with the groove 16 in the portions thereof between the inclined surfaces 17 and serve to securely hold the ferrule 11 in place.

Since certain changes can be made in the foregoing ferrule construction and different embodiments of the invention can be made without departing from the spirit and scope thereof, it is intended that all matters shown in the accompanying drawing and described hereinbefore shall be interpreted as illustrative and not in a limiting sense.

I claim as my invention:

1. A welding stud ferrule comprising a generally cylindrical collar of heat resisting material centrally apertured to receive the welding stud for confining the molten products of the welding operation and excluding the atmosphere therefrom, said collar having a recess in its outer surface between the upper and lower faces thereof for receiving gripping means to hold the same in place with respect to the welding stud while the welding operation is being performed, the upper edge of said collar having an inclined planar surface defined by a plane intersecting said collar intermediate its upper surface and said recess to facilitate automatic gripping of the same by the gripping means by relative rotation of said collar and gripping means after movement of the latter into registry with said recess over said inclined surface.

2. A welding stud ferrule comprising a generally cylindrical collar of heat resisting material centrally apertured to receive the welding stud for confining the molten products of the welding operation and excluding the atmosphere therefrom, said collar having a peripheral groove in its outer surface between the upper and lower faces thereof for receiving gripping means acting at diametrically opposite positions to hold the same in place with respect to the welding stud while the welding operation is being performed, the upper edge of said collar having diametrically oppositely located inclined planar surfaces defined by planes intersecting said collar intermediate opposite parts of its upper surface and said peripheral groove to facilitate automatic gripping of the same by the gripping means by relative rotation of said collar and gripping means after movement of the latter into registry with said peripheral groove over said surfaces.

ALBERT M. CANDY.

REFERENCES CITED

The following references are of record in the file of this patent:

UNITED STATES PATENTS

| Number | Name | Date |
| --- | --- | --- |
| 2,315,502 | Crecca et al. | Apr. 6, 1943 |